United States Patent [19]

Ohishi et al.

[11] Patent Number: 4,640,698
[45] Date of Patent: Feb. 3, 1987

[54] AIR CLEANER DEVICE

[75] Inventors: Toshio Ohishi, Sagamihara; Yohji Kurotobi, Asaka, both of Japan

[73] Assignee: Honda Giken Kogyo Kabushiki Kaisha, Tokyo, Japan

[21] Appl. No.: 731,631

[22] Filed: May 7, 1985

[30] Foreign Application Priority Data

May 21, 1984 [JP] Japan ............................ 59-74225[U]

[51] Int. Cl.⁴ ............................................. B01D 46/00
[52] U.S. Cl. ......................................... 55/502; 55/503
[58] Field of Search ................... 55/502, 503, 521, 497

[56] References Cited

U.S. PATENT DOCUMENTS

| 3,249,172 | 5/1966 | De Lorean | 55/502 X |
| 3,413,780 | 12/1968 | Amlott et al. | 55/502 X |
| 4,157,902 | 6/1979 | Tokar | 55/502 X |
| 4,283,207 | 8/1981 | Martyniuk | 55/521 X |
| 4,300,928 | 11/1981 | Sugie et al. | 55/502 X |
| 4,322,230 | 3/1982 | Schoen et al. | 55/502 X |
| 4,438,057 | 3/1984 | Sundseth | 55/521 X |
| 4,478,617 | 10/1984 | Rees | 55/502 X |
| 4,488,889 | 12/1984 | McCarroll | 55/502 X |

FOREIGN PATENT DOCUMENTS

| 0059212 | 5/1977 | Japan | 55/521 |
| 0018451 | 1/1982 | Japan | 123/198 E |
| WO83/00292 | 2/1983 | PCT Int'l Appl. | |
| 799119 | 7/1958 | United Kingdom | |
| 885767 | 6/1960 | United Kingdom | |
| 1367701 | 1/1971 | United Kingdom | |
| 2075364 | 5/1981 | United Kingdom | |

Primary Examiner—Charles Hart
Attorney, Agent, or Firm—Armstrong, Nikaido, Marmelstein & Kubovcik

[57] ABSTRACT

An air cleaner device is disclosed of the type comprising a cleaner element assembly disposed in a cleaner case which is divided into an uncleaned air chamber and a cleaned air chamber. The air cleaner element assembly includes a cleaner element, and a seal joint hermetically sealing the cleaned air chamber and integrally connected to the cleaner element. The cleaner element can thereby be easily mounted in the cleaner case, and the filtered air can be provided to the intake system without being contaminated by uncleaned air.

8 Claims, 4 Drawing Figures

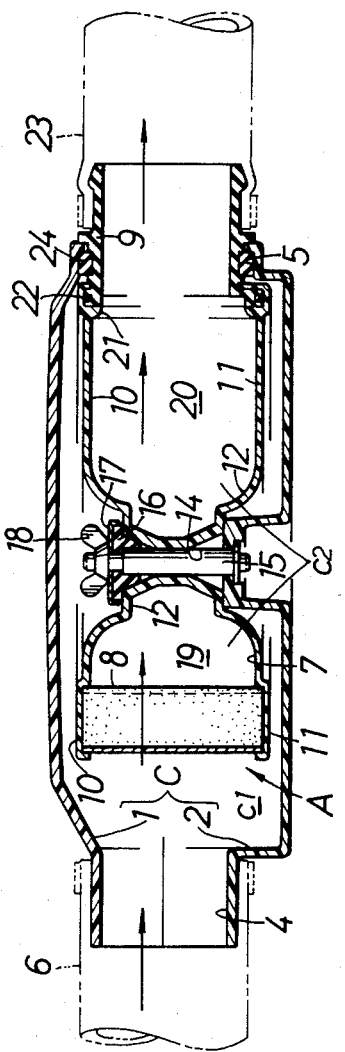
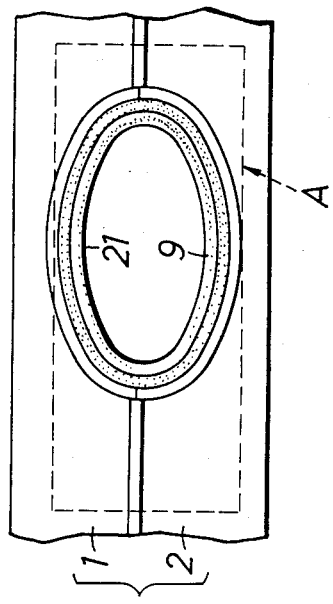
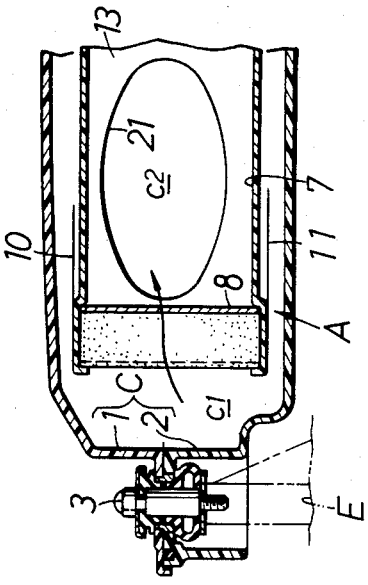

AIR CLEANER DEVICE

BACKGROUND OF THE INVENTION

1. Field of the Invention

The present invention is directed to an air cleaner device connected to the intake system of an internal combustion engine, and more particularly to an air cleaner device which includes a seal joint hermetically sealing the clean air chamber of the cleaner element.

2. Description of the Prior Art

A conventional air cleaner device connected to the end of the intake system of an internal combustion engine is shown in Japanese Patent Publication No. 19661/1963. In this type of air cleaner, the cleaner element has to be replaced periodically. This requires ease of mounting of the cleaner element in the cleaner case. The device further requires that the cleaned air be guided towards the intake system without allowing uncleaned air to merge with the cleaned air. In the conventional air cleaner device, however, these requirements are not fully met because the seal between the cleaned air chamber and the intake system is not tight enough.

SUMMARY OF THE INVENTION

It is the primary object of the present invention to provide a highly reliable air cleaner device in which the cleaner element can be mounted easily and in which the cleaned air chamber, formed in the cleaner element assembly, and the intake system are hermetically connected to each other with a sufficiently tight seal.

The present invention is directed to an air cleaner device of the type comprising a cleaner element assembly disposed in a cleaner case which is divided into an uncleaned air chamber and a cleaned air chamber. The air cleaner element assembly includes a cleaner element, and a seal joint hermetically sealing the cleaned air chamber and integrally connected to the cleaner element. The cleaner element can thereby be easily mounted in the cleaner case, and the filtered air can be provided to the intake system without being contaminated by uncleaned air.

BRIEF DESCRIPTION OF THE DRAWINGS

FIG. 2 is a sectional view taken along the line II—II of FIG. 1;

FIG. 3 is a view taken in the direction of an arrow line III of FIG. 1; and

FIG. 4 is a sectional view taken along the line IV—IV of FIG. 1.

DETAILED DESCRIPTION OF THE PREFERRED EMBODIMENT

Figure 1:
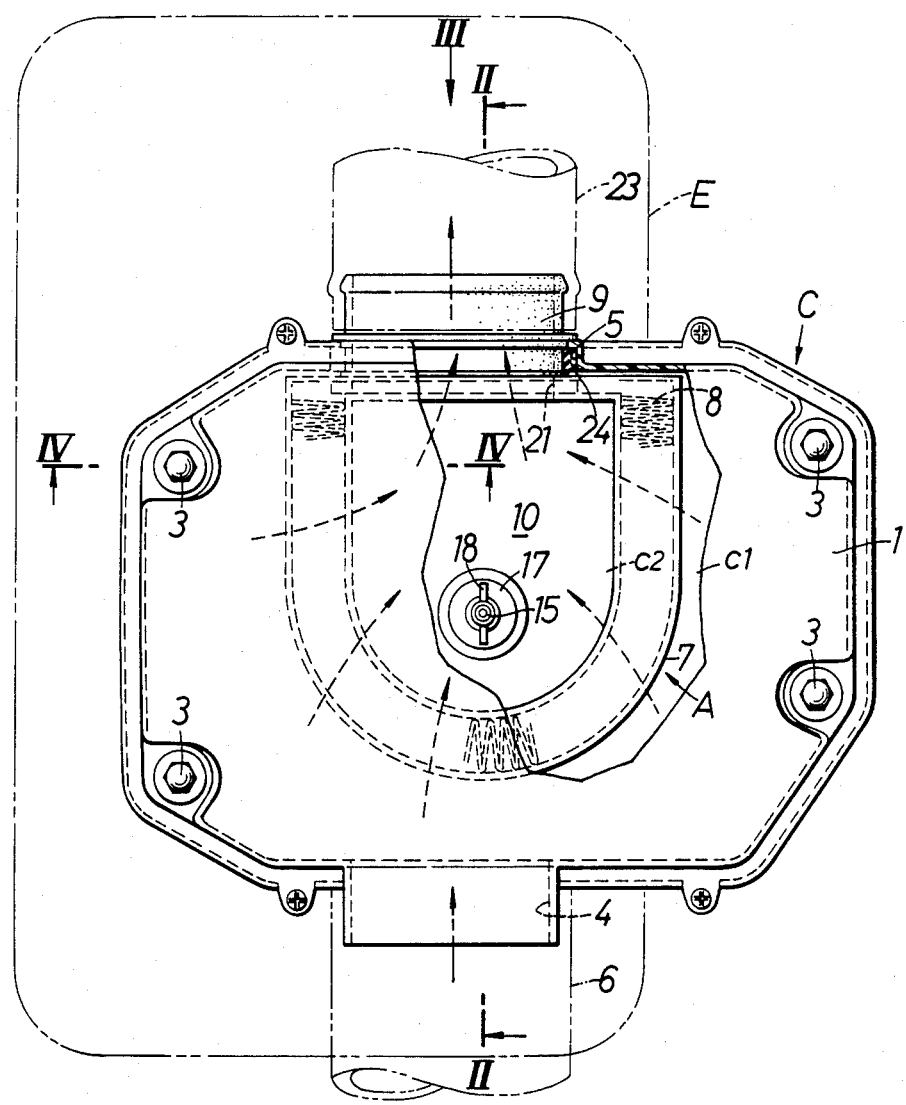
FIG. 1 is a partial plan view of the preferred embodiment of the present invention.

Referring to the drawings, an air cleaner device mounted on an internal combustion engine E has a cleaner case C and a cleaner element assembly A mounted in the cleaner case C.

As shown in FIGS. 1 and 4, the cleaner case C has a generally flat form and comprises an upper half part 1 and a lower half part 2 coupled to each other by a plurality of bolts 3. The cleaner case C has an inlet 4 on one side and a hole 5 for receiving and supporting a seal joint 9 on the other side. An air duct 6 opening to the atmosphere is connected to the inlet 4.

The air cleaner element assembly A comprises a cleaner element holder 7, cleaner element 8 held in the holder 7 and seal joint 9 hermetically connected to the cleaner element holder 7.

The cleaner element holder 7 is made of a hard synthetic resin material and has a half elliptic form with a substantially flat top and bottom formed by flat upper and lower walls 10 and 11, U-shaped side wall 12 and a flat end wall 13. Spaces 19 and 20, having substantially U-shaped cross-sections, are formed by the U-shaped side wall 12 and the end wall 13. The cleaner element holder 7 has a mounting hole 14 through the upper and lower walls 11 and 12 at a position near the curved portion of the side wall 12, the hole 14 being located at the mid region substantially on the lateral axis of the holder 7. A mounting bolt 15, fixed to a central portion of the lower half part 2 of the cleaner case C, is received in the mounting hole 14 and a butterfly nut 18 is screwed to the upper end of the mounting bolt 15 through a cushioning member 16 and a washer 17, for fixing the cleaner element holder 7 to the cleaner case C.

The cleaner element 8 formed into a U-like shape is received in the outer end portion of space 19 formed in the U-shaped side wall 12 of the cleaner element holder 7. As in the case of an ordinary air cleaner, the cleaner element 8 is formed by folding a sheet of cleaner element paper in a zig-zag form. An uncleaned air chamber $C_1$ is formed outside the cleaner element holder 7 and the cleaner element 8, while a cleaned air chamber $C_2$ is formed inside the element holder 7 and the cleaner element 8. An oval outlet 21 is formed in the flat end wall of the cleaner element holder 7. One end of seal joint 9 which is formed of a rubber material is connected to the outlet 21 through a seal ring 22. The seal ring 22 hermetically seals the cleaned air chamber $C_2$. The seal joint 9 is received and supported by the hole 5 formed in the cleaner case C through a packing 24. A connecting pipe 23 is connected to the outer end of the seal joint 9. The connecting pipe 23 leads to the intake system of the internal combustion engine E having a carburetor (not shown).

In operation, the intake vacuum generated as a result of engine operation is applied to the uncleaned air chamber $C_1$ through an intake pipe (not shown) and through the cleaned air chamber $C_2$ of the cleaner element assembly A and then through the cleaner element 8, so that the ambient air flows into the uncleaned air chamber $C_1$ of the cleaner case C through the air duct 6. Then, the air flows through the cleaner element 8 of the cleaner element assembly A, where it is filtered, to the inside of the cleaner element 8, i.e., into the cleaned air chamber $C_2$. The cleaned air in chamber $C_2$ is drawn by the engine, through the seal joint 9 and the connecting pipe 23. Since the seal joint 9, hermetically seals the cleaned air chamber $C_2$, and is integrally connected to cleaner element holder 7 via seal ring 22, the filtered air can be brought to the engine without being contaminated by uncleaned air.

As has been described, the cleaner element assembly mounted in the cleaner case of the air cleaner device of the invention comprises a cleaner element, a cleaner element holder holding the cleaner element, and a seal joint hermetically sealing the cleaned air chamber and integrally connected to the cleaner element holder. Therefore, the clean air after filtration by the cleaner element, can be brought to the intake system without being contaminated by atmospheric air, i.e., uncleaned air, even when no special sealing means is provided in the junction between the cleaner case and the cleaned air chamber in the cleaner element assembly. Thus, the invention eliminates the necessity for the seal between the cleaner case and the cleaned air chamber which is necessary in a conventional device, and the cleaned air after filtration can be brought directly to the intake system.

Furthermore, as the seal joint is directly and integrally connected to the cleaner element holder, the cleaned air chamber defined within the cleaner element holder by a cleaner element being attached thereto is already placed in a sealed state at its outlet from the atmosphere due to the seal joint. Conventionally, seal joints have been necessitated for the purpose of connecting between an air cleaner casing and an air intake pipe so that according to the invention an effective seal is obtained without being accompanied by the increase in number of components when compared with conventional devices. Accordingly, portions to be checked their sealed state during assembly of an air cleaner device are made few, enhancing the assemblability.

In addition, owing to the advantageous structure of an air cleaner device according to the invention as mentioned above, the replacement of the cleaner element can be carried out in the following simple process. Namely, in disassembling the device, the bolts 3 are first unscrewed from the cleaner case C to separate the upper half part 1 from the lower half part 2. Next, the connecting pipe 23 is disconnected from the seal joint 9 and by dismounting the nut 18 from the bolt 15 the cleaner element holder 7 and element 8, integral with the seal joint 9, are taken apart from the lower half part 2. Then, the element 8 is replaced by a new one. Assembling of the device is performed by conducting the above disassembling steps reversely. Throughout all the disassembling and assembling steps for replacement of the cleaner element, the holder 7 and the seal joint 9 are held in a connected state so that the sealed portion therebetween need not be inspected. Thus, the cleaner element 8 can be separated from the cleaner case C while maintaining the hermetic connection between the cleaned air chamber $C_2$ and the seal joint 9 so that it is not necessary to provide an airtight seal between the cleaner element assembly and the cleaner case each time the filter element is replaced. Consequently, the replacement of the cleaner element can be conducted easily and quickly.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:
1. An air cleaner device comprising
   (a) a cleaner case;
   (b) a cleaner assembly means disposed in said cleaner case and dividing the space in said cleaner case into an uncleaned air chamber outside the assembly means and a cleaned air chamber inside the assembly means, said cleaner assembly means comprising
      (i) a cleaner element;
      (ii) a holder means affixed to said cleaner case for holding said cleaner element; and
      (iii) seal means, connected to said holder means, for hermetically sealing said cleaned air chamber, said seal means being adapted for connection to an air intake system; wherein said seal seal means comprises a seal joint, and seal ring positioned between said seal joint and said holder means, said seal joint providing a hermetic seal of the cleaned air chamber against outside;
   (c) said cleaner case consisting of an upper half part and a lower half part which are coupled to each other at peripheral edge portions thereof, and wherein a hole is provided at a mating part of the peripheral edge portions of said upper and lower half parts, said seal joint being fitted into said hole of the cleaner case.

2. An air cleaner device as set forth in claim 1 including a packing means positioned between said seal joint and said cleaner case.

3. An air cleaner device as set forth in claim 1, wherein when said cleaner case is disassembled from said cleaner assembly means, said seal joint holds its hermetical connection to said holder means.

4. An air cleaner device as set forth in claim 1, wherein said seal joint is disposed extending fluid tightly through said cleaner case to outside.

5. An air cleaner device as set forth in claim 1, wherein an air inlet is formed in said cleaner case at a side wall thereof opposed to said hole.

6. An air cleaner device as set forth in claim 1, wherein said cleaner case has an air inlet at an opposed position to said hole; said cleaner element holder is provided with an air outlet at an end wall thereof; said uncleaned air chamber communicating with said air inlet and said cleaned air chamber communicating with said air outlet, and wherein said seal joint is hermetically connected to said air outlet of the holder via said seal ring and projects through said hole of the cleaner case to outside for connection to said air intake system.

7. An air cleaner device as set forth in claim 6, wherein a packing is interposed between said hole and said seal joint.

8. An air cleaner device as set forth in claim 6, wherein said cleaner element holder has a half elliptic form with a straight inside portion, said end wall being provided at said straight side portion.

* * * * *